Oct. 18, 1966　　　　　　　　M. W. LINDMAN　　　　　　　3,279,187
ROCKET-RAMJET PROPULSION ENGINE
Filed Dec. 9, 1963　　　　　　　　　　　　　　　　　　　2 Sheets-Sheet 2
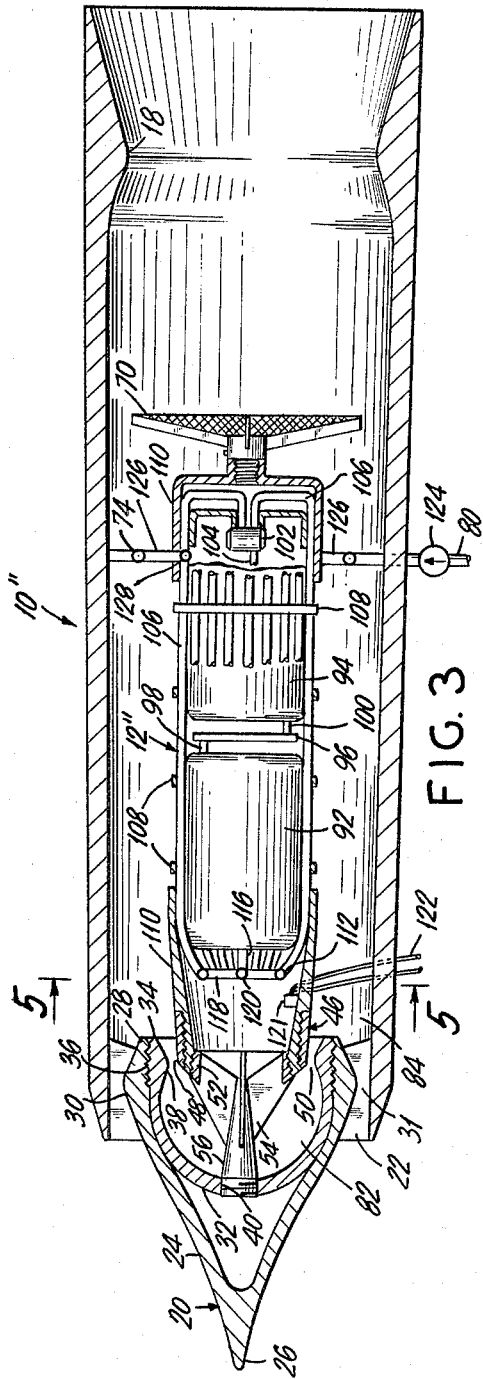
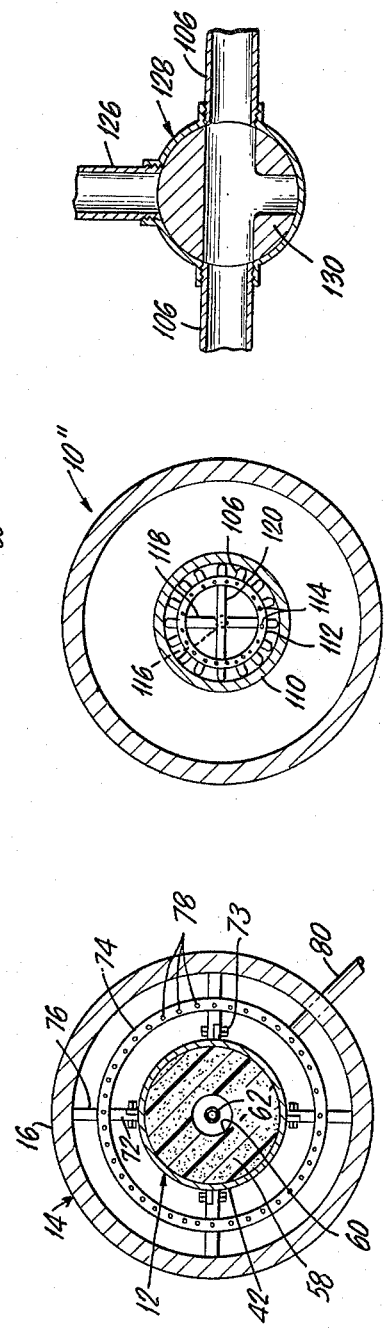
INVENTOR.
MORRIS W. LINDMAN
BY Felshin and Rosen
ATTORNEYS.

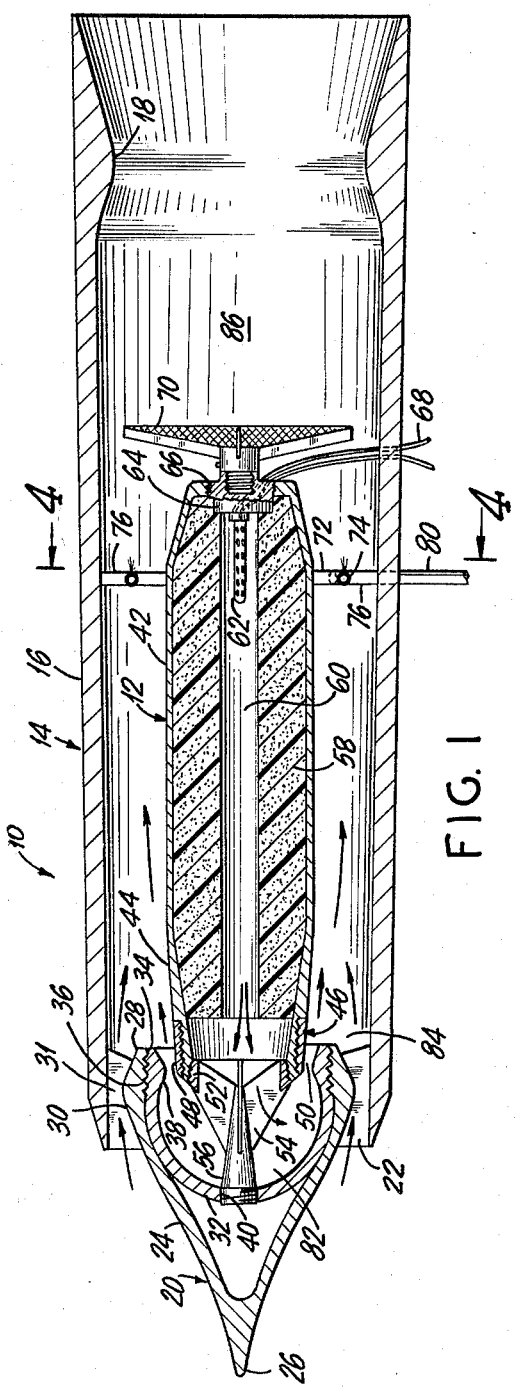

United States Patent Office 3,279,187
Patented Oct. 18, 1966

3,279,187
ROCKET-RAMJET PROPULSION ENGINE
Morris W. Lindman, 809 N. Belgrade Road,
Silver Spring, Md.
Filed Dec. 9, 1963, Ser. No. 328,815
4 Claims. (Cl. 60—245)

This invention relates to power plants especially suitable for propelling missiles, aircraft, helicopters and other vehicles.

An object of the invention is to provide a rocket-ramjet propulsion engine in which the rocket motor is arranged with respect to the housing of the ramjet engine so that the ramjet housing serves as the augmenter tube for augmentation of the thrust of the rocket motor.

Another object is to provide an engine of the indicated type in which the respective arrangement of the rocket motor and the ramjet engine results in a relatively small, simple engine which develops a high thrust in relationship to its total weight.

Another object is to provide a rocket-ramjet engine in which the ramjet housing serves as a thrust augmenter tube for the rocket motor.

A further object is to provide an improved rocket-ramjet propulsion engine which can operate optimumly in various flight regimes, as a pure rocket motor on takeoff, as an augmented rocket motor for boost after takeoff, as a ramjet engine for cruising, as a rocket-ramjet engine at speeds above which ramjet engines operate efficiently, and as a rocket motor after exit of the vehicle from the atmosphere.

Another object is to provide a rocket-ramjet propulsion engine in which the rocket motor is positioned within the ramjet housing so that the exhaust gases from the rocket motor mix with the ramjet incoming air substantially concomitantly with the flow of the air into the engine.

Another object is to provide a rocket-ramjet engine which includes means for simultaneously providing a static thrust in combination with an augmented thrust.

A further object is generally to provide an improved rocket-ramjet engine which has a relatively high thrust in relation to its size and weight.

The above and other objects, features and advantages of the invention will be more fully understood from the following description of the invention considered in connection with the accompanying illustrative drawings of the invention in which:

FIG. 1 is a longitudinal cross section of a rocket-ramjet propulsion engine in accordance with the invention;

FIG. 2 is a view similar to FIG. 1 and illustrates a modification;

FIG. 3 is another view similar to FIG. 1 and illustrates another modification;

FIG. 4 is a cross section taken on line 4—4 of FIG. 1;

FIG. 5 is a cross section taken on line 5—5 of FIG. 3; and

FIG. 6 is a sectional view of a three-way valve.

The task of augmenting the thrust of a solid or liquid propellant rocket motor is usually solved by introducing the oxidizer, usually air, into the stream of exhaust gases from the rocket which are usually rich in fuel. Heretofore, such air has been inducted within the confines of an augmenter tube which encloses the rocket exhaust jet and extends in an aft direction from the exhaust nozzle. The air and rocket exhaust are mixed thoroughly and brought to a condition which is conducive to stable burning. The resulting burned gases are exhausted through a nozzle as a high speed exhaust jet to provide the required thrust for propulsion. While the thrust has been substantially increased, the weight and length of the augmenter tube have resulted in a rather unwieldly power plant as regards size and weight which offsets the benefits from the increased thrust.

I have discovered that if a rocket were placed within a ramjet engine with the combustion chamber of the rocket near the forward end of the combined engine, and the rocket exhaust gases made to turn approximately 180 degrees to mix with the ramjet incoming air, substantially concomitantly with the flow of the air into the engine, then augmentation of the rocket thrust is achieved without the heretofore increase in size and weight of the engine. The ramjet engine housing serves as an augmenter tube and since it has another function in the operation of the rocket-ramjet engine, its weight is not to be charged against the thrust augmentation which it performs during augmentation of the thrust of the rocket motor.

Referring now to the drawings in detail, and first to FIGS. 1 and 4, the rocket-ramjet engine 10 comprises a rocket motor 12 positioned within a ramjet engine 14. The ramjet engine comprises a cylindrical tubular member or housing 16 having an exhaust nozzle 18 at its exhaust end. A hollow diffuser 20 is secured at the opposite inlet end of the housing by a series of circumferentially spaced ribs 22 which are suitably secured to the inner surface of the housing and the outer surface of the diffuser, at the aft end of the diffuser. The forward end of the diffuser extends from the forward end of the housing and the diffuser has an external shape which is generally conical except that outer surface 24 bellows slightly inwardly near tip 26 of the diffuser. The outer surface 28 of the diffuser, near its aft end, converges inwardly and is spaced from the adjacent inner surface of the housing as is the adjacent outer surface 30 of the diffuser to form circumferentially spaced passages 31 between ribs 22 for the ramjet incoming air.

A hemispherically-shaped bucket 32 is positioned within the hollow of diffuser 20 and for this purpose the outer surface 34 of the aft end of the bucket is threaded and screwed to the threaded inner surface 36 at the aft end of the diffuser. A converging-diverging inner surface 38 is provided at the aft end of the bucket for a purpose which will be more clearly understood hereinafter. The central portion of the forward end of the bucket is provided with a threaded aperture 40 for supporting one end of rocket motor 12 as will be seen hereinafter.

Rocket motor 12 comprises a cylindrical tubular housing 42 having a forward end 44 that converges inwardly toward bucket 32. A ring 46 is screwed onto the terminal portion of end 44 and it is to be noted that the outer surface 48 of the ring is converging-diverging and forms with surface 38 a converging-diverging annular passage or nozzle 50 for the exhaust gases from the rocket. Passage 50 is adjacent passages 31. A ring 52 is screwed to the terminal portion of the inner surface of the forward end of rocket housing 42 and one end of each of a series of circumferentially spaced ribs 54 are secured to the inner surface of ring 52 while the opposite ends of the ribs are secured to the outer surface of a tapered support member 56 which is screwed into threaded aperture 40 of bucket 32 for supporting the forward end of rocket 12 within the ramjet housing 16.

The interior of rocket housing 42 is filled with a cylinder 58 of a suitable solid rocket propellant. A longitudinally extending axial passage 60 is provided in the cylinder and a hollow apertured tube 62 of a squib and igniter assembly 64 extends into the aft end of passage 60. For this purpose the aft end of housing 42 is provided with a threaded central aperture 66 into which assembly 64 is screwed. The ignition wires for assembly 64 are shown at 68 and they may extend through ramjet housing 16 for connection to a suitable source of electrical energy for initiation of the igniter assembly. A flameholder 70 is screwed into the end of assembly 64.

The aft end of rocket housing 42 is supported on a series of circumferentially spaced support rods 72 which extend inwardly from a ramjet fuel injector ring 74 that surrounds the aft end of the rocket housing. The fuel ring is supported in concentric relation with respect to the rocket housing by a series of circumferentially spaced support rods 76 that are suitably secured to the inner surface of ramjet housing 16 and ring 74. The fuel ring is provided with a series of fuel outlet holes 78 and fuel is transmitted to the ring via a supply pipe 80 that extends through housing 16 to a suitable source of fuel.

From the above description of engine 10, it is to be observed that the rocket motor may be readily assembled in ramjet housing 16 by merely inserting the motor endwise through exhaust nozzle 18 of the ramjet engine and screwing support member 56 into threaded aperture 40. Rocket housing support rods 72 have their terminal ends positioned so that they are adjacent the outer surface of the rocket housing for engaging the latter and supporting the aft end of the rocket motor. Of course, flameholder 70 has an outer diameter which is less than the diameter of nozzle 18. The rocket motor may also be unscrewed at ring 52 for removal from the ramjet housing or for connection thereto when bucket 32 and members 56, 54 and ring 52 are secured to diffuser 20. Squib and igniter assembly 64 may be assembled to the aft end of the rocket motor after the latter has been installed in the ramjet houshing by merely inserting the assembly through nozzle 18 and screwing it into the aft end of the housing. In this manner, storage of pyrotechnics within the engine, while the engine is not being used, is avoided. The flameholder can thereafter be screwed to the squib and igniter assembly.

It is within the scope of the invention to replace support member 56 with an explosive bolt so that the rocket motor can be disconnected from the ramjet engine by exploding the bolt. In such case, the rear of the rocket may be supported in any conventional, easily separable fashion, such as by explosive bolts 73 shown in FIGURE 4. The unconnected rocket motor can then fall from the ramjet housing through nozzle 18. To avoid any possible interference from flameholder 70, it is preferred that it be replaced by a flameholder secured to the ramjet housing and having its parts positioned so as not to interfere with any movement of the rocket motor. It is also within the scope of the invention to provide a rocket motor which is entirely consumed by its operation by eliminating rocket housing 42 and enveloping the propellant in a layer of combustible plastic material.

The engine is operated by energizing wires 68 which ignites the squib and igniter assembly 64, blowing the igniter pellets through tube 62 to ignite propellant 58. The resulting burning gases flow forwardly through passage 60 and impinge on turning bucket 32 which causes the gases to turn 180° and flow past and between ribs 54, with the concomitant increase in pressure within chamber 82 formed by the bucket. The gases flow through annular converging-diverging passage 50, in which the gases are expanded, and flow from passage 50 into the annulus 84 formed between the forward ends of the ramjet and rocket housings at relatively high speed and low pressure, thereby inducing air to flow past the diffuser through passages 31 to mix immediately with the rocket exhaust gases. Further mixing occurs as the gases move downstream in the annulus formed between the ramjet and rocket housing and the gases are thoroughly mixed by the time they reach the aft end of the rocket motor. The gas mixture flows into the ramjet combustion chamber 86, downstream of flameholder 70 with the flame held at the flameholder. It is to be seen that the energy in the fuel rich exhaust gases has been recovered by mixing the exhaust gases immediately with incoming ramjet air, and the resulting combustion of the fuel in the exhaust gases provides additional thrust as the now completely burned gases are exhausted through nozzle 18.

After propellant 58 is consumed, ramjet engine fuel can be injected through fuel ring 74 and mixed with the ramjet air for burning in chamber 86, and the resulting operation of the engine is as a pure ramjet engine.

It is to be understood that the turning of the gases in bucket 32 is accomplished at a subsonic flow speed of the rocket exhaust gases resulting in very little friction loss. The engine develops a static thrust on the ground at a level more or less the same as an unaugmented rocket, depending upon the quantity of air inducted while the engine is on the ground. The thrust will certainly exceed the unaugmented rocket when some measure of a flight speed is attained and additional air is inducted past the diffuser.

The shape of the outer wall of the rocket housing is circular but it will be understood that it need not be so shaped but, on the contrary, can be shaped otherwise to enhance the flow of gases in the annulus between the rocket motor and ramjet housings. Also, annular passage 50 has been described as converging-diverging but it may also have a converging shape only.

Referring now to FIG. 2, there is shown a rocket-ramjet engine 10′ wherein the rocket motor 12′ includes means for providing an unaugmented static thrust in combination with the previously described augmented thrust. In brief, this is accomplished by providing a rocket motor which exhausts simultaneously at its opposite ends in a ramjet engine as previously described. More particularly, housing 42′ is provided with an exhaust nozzle 88 and propellant 58′ is divided into propellant sections 58a and 58b by a section 90 of relatively slow burning propellant grain. It is to be understood that the part of the rocket motor aft of section 90 is a conventional rocket booster. A squib and igniter 64a is provided for propellant section 58a and a squib and igniter section 64b is provided for propellant section 58b. It is to be noted that the external shape of rocket housing 42′ is different from that of housing 42 and is such as to provide a varying flow-through area for the air and rocket exhaust gas mixture to cause expanding and compressing of the mixture as it flows through the engine. A can type flameholder 70′ is provided at the aft exhaust of the rocket and is in the form of a frustrum of a cone. It is to be observed that the engine of FIG. 2 is of a type comprising a straight rocket providing unaugmented thrust for boost off the ground, an augmented rocket for use in mid-range boost and the pure ramjet which operates after the propellant is exhausted.

It is within the scope of the invention, with respect to engine 10′, to provide a conventional rocket booster attached aft of nozzle 18 and exhausting rearwardly in the conventional manner for boost off the ground. Rocket motor 12′ may also be formed by two separate rocket motor casings mounted in back-to-back relation and exhausting in opposite directions, thereby eliminating propellant section 90. In all other respects engine 10′ is similar to engine 10.

FIGS. 3, 5 and 6 illustrate another form of the invention in which rocket-ramjet engine 10″ utilizes a liquid propellant for the rocket motor 12″ rather than a solid propellant. Motor 12″ comprises a cylindrical tank 92 of an oxidizer and another cylindrical tank 94 of a suitable fuel. Tank 94 is positioned in axial alignment aft of tank 92 and is separated from the latter by a pressure equalizing tank 96 in communication with tanks 92 and 94 by pipes 98 and 100. A fuel pump 102 is suitably positioned in tank 94 and pumps fuel from pump inlet pipe 104 to a series of longitudinally extending fuel delivery pipes 106 which are spaced circumferentially around tanks 92 and 94 and held in place by a series of longitudinally spaced circular straps 108. The aft end of the engine is provided with a suitably secured cap 110 into which the flameholder 70 is screwed.

The fuel delivery pipes 106 are connected to a circular fuel mixing ring and ejector 112 provided with a series of circumferentially spaced fuel outlet openings 114. The forward end of oxidizer tank 92 is provided with an outlet pipe 116 which is connected to pipes 118 and 120, the latter being connected to ring 112. In this manner fuel and oxidizer are simultaneously mixed in ring 112 and ejected into bucket combustion chamber 82. The spark plug igniter for the fuel-oxidizer mixture is indicated at 121 and the ignition wire at 122. The ramjet fuel supply pipe 80 is preferably provided with a check valve 124. Circumferentially spaced pipes 126 interconnect ramjet fuel ring 74 with each rocket fuel supply pipe 106 via a three-way valve 128 (FIG. 6).

In operating engine 10″, rotary valve member 130 of valves 128 are positioned as shown in FIG. 6 and fuel is delivered by pump 102 through pipes 106 to ring 112 and the fuel-oxidizer mixture is injected into combustion chamber 82 and concurrently ignited by spark plug igniter 128. The operation of the engine is now on augmented thrust rocket cycle with the thrust dependent on the amount of air inducted into annular space 84. When the application of the engine requires that it operate as a pure ramjet, valve member 130 is rotated 90° counterclockwise as viewed in FIG. 6 so that fuel flows to ramjet fuel injector ring 74 from rocket fuel tank 94. Check valve 124 prevents flow back of fuel from ring 74 to supply pipe 80. Alternatively, valve 128 may be left as illustrated by FIG. 6 and pump 102 shut off, and ramjet fuel supplied through pipe 80, as previously described.

Rocket motor 12″ may also comprise one tank containing monopropellant suitable for rocket as well as ramjet operation, in lieu of the separate tanks illustrated by FIG. 3.

It is to be noted with respect to engine 10″ that the annular space between the rocket and ramjet housings is regeneratively cooled by the flow of fuel forward to injector ring 112, and the fuel is also preheated before mixing with the oxidizer for rocket operation. Should the vehicle being propelled by engine 10″ be required to exit the atmosphere, then fuel flow to ramjet fuel injector ring 74 is stopped and valve member 130 rotated into the position shown in FIG. 6 for delivery of rocket fuel to rocket fuel injector ring 112 whereby the engine operates as an unaugmented rocket.

While I have shown and described the preferred embodiments of the invention, it will be understood that the invention may be embodied otherwise than as specifically shown and described herein, and that certain changes in the form and arrangement of parts and in the specific manner of practicing the invention may be made without departing from the underlying ideas or principles of this invention within the scope of the appended claims.

I claim:

1. A rocket-ramjet engine comprising, a longitudinally extending tubular ramjet housing member having an open forward end through which ramjet combustion air flows and an opposite open aft end through which the exhaust gases flow, a rocket motor positioned within said housing member and having an exhaust opening at its forward end, said rocket motor being positioned at the forward end of said ramjet housing member, means in confronting relation with said exhaust opening of said rocket motor for turning the rocket exhaust gases to cause the same to flow from said forward end of said ramjet housing member to said aft end of said ramjet housing member, means releasably connecting said forward end of said rocket motor to said exhaust gas turning means, and means connected to said ramjet housing member and releasably supporting said rocket motor at said aft end thereof.

2. A rocket-ramjet engine as defined in claim 1, wherein said rocket motor comprises a tubular casing having a solid propellant therein.

3. A rocket-ramjet engine as defined in claim 1, wherein said rocket motor comprises a tubular housing, a container for liquid fuel, and a container for an oxidizer, and fuel injector means positioned between the forward end of said rocket motor and said exhaust gas turning means, and means for transmitting rocket fuel to said fuel injector means.

4. A rocket-ramjet engine, comprising a longitudinally extending tubular ramjet housing member provided with an open inlet end for ramjet incoming air and an exhaust nozzle at its opposite end for exhaust gases, a diffuser positioned within said open inlet end and having an outer wall surface at its aft end spaced from the adjacent inner wall surface of said housing member to form a passage for the incoming ramjet air, said diffuser having a hollow portion, a curved gas turning member positioned in said hollow portion, a rocket motor positioned within said ramjet housing member and extending longitudinally along the axis thereof, said rocket motor having a forward end positioned at said inlet end of said ramjet housing member, said rocket motor having an exhaust opening at its forward end in confronting spaced relation with said gas turning member to form a passage for the rocket exhaust gases, said exhaust gas passage being positioned adjacent said passage for said ramjet incoming air, means for securing said rocket motor to said diffuser, said last named means comprising a ring member secured to the forward end of the rocket motor, a plurality of circumferentially spaced ribs extending longitudinally forward of said ring member, a tapered support member secured to the outer ends of said ribs, said tapered support member being releasably secured to the gas turning means at a point centrally thereof, and means positioned downstream of said forward end of said rocket motor for injecting ramjet fuel into said housing member.

References Cited by the Examiner

UNITED STATES PATENTS

| | | | |
|---|---|---|---|
| 2,419,866 | 4/1947 | Wilson. | |
| 2,504,648 | 4/1950 | Chandler | 60—35.6 X |
| 2,632,294 | 3/1953 | Wall | 60—35.6 |
| 2,735,263 | 2/1956 | Charshafian | 60—35.6 |
| 2,821,350 | 1/1958 | Smurik. | |
| 2,948,112 | 7/1960 | Smith | 60—35.6 |
| 3,063,240 | 11/1962 | Ledwith | 60—35.6 |
| 3,173,250 | 3/1965 | Matzenauer | 60—35.6 |

FOREIGN PATENTS

| | | |
|---|---|---|
| 503,166 | 3/1920 | France. |
| 1,109,645 | 9/1955 | France. |

MARK NEWMAN, *Primary Examiner.*

CARLTON R. CROYLE, *Examiner.*